United States Patent [19]

Dromsky et al.

[11] Patent Number: 4,559,089

[45] Date of Patent: Dec. 17, 1985

[54] METHOD FOR MAKING A LIGHT WEIGHT COMPOSITE OF PURE ALUMINUM, HEAT TREATABLE ALUMINUM, AND STAINLESS STEEL

[75] Inventors: John A. Dromsky, North Attleboro; Charles H. Zenuk, Rehoboth, both of Mass.

[73] Assignee: Texas Instruments Incorporated, Dallas, Tex.

[21] Appl. No.: 581,488

[22] Filed: Feb. 17, 1984

Related U.S. Application Data

[63] Continuation of Ser. No. 83,920, Oct. 11, 1979, abandoned.

[51] Int. Cl.[4] .................................... C21D 1/00
[52] U.S. Cl. ............................ 148/11.5 Q; 428/653; 428/654; 228/116
[58] Field of Search ............... 428/654, 653; 228/116; 148/11.5 Q

[56] References Cited

U.S. PATENT DOCUMENTS

| | | | |
|---|---|---|---|
| 1,898,229 | 2/1933 | Veale | 293/120 |
| 2,490,543 | 12/1949 | Robertson et al. | 148/11.5 Q |
| 3,564,585 | 2/1971 | Camp | 148/11.5 Q |
| 3,740,828 | 6/1973 | Buchinski et al. | 228/116 |
| 3,884,729 | 5/1975 | Jackson et al. | 148/11.5 Q |
| 4,167,606 | 9/1979 | Ulam | 428/654 |
| 4,202,709 | 5/1980 | Shibamori | 148/11.5 Q |

Primary Examiner—Veronica O'Keefe
Attorney, Agent, or Firm—John A. Haug; James P. McAndrews; Melvin Sharp

[57] ABSTRACT

A composite, light weight vehicular bumper material is disclosed which has a surface layer of stainless steel, a principal layer of a heat treatable aluminum and an intermediate layer of essentially commercially pure aluminum. The stainless steel provides the desired surface finish and durability; the surface can be flash chromed if desired to provide a suitable bright, specular appearance. The layer of heat treatable aluminum is the principal structural component and provides the high ratio of strength to weight needed for the application. The intermediate layer of pure aluminum serves as a transition zone between the principal and surface layers aiding in the development of the maximum bond strength between those two components. In its application the composite is heat treated to obtain desired mechanical strength characteristics. In a second embodiment another layer of essentially commercially pure aluminum is provided on the reverse side from the surface layer of stainless steel, enhancing the corrosion resistance of the principal aluminum layer. All the layers are metallurgically bonded to one another.

4 Claims, 3 Drawing Figures

METHOD FOR MAKING A LIGHT WEIGHT COMPOSITE OF PURE ALUMINUM, HEAT TREATABLE ALUMINUM, AND STAINLESS STEEL

This application is a continuation, of application Ser. No. 83,920, filed 10/11/79 now abandoned.

This invention relates generally to composite material and more specifically to such material particularly suitable for vehicular bumpers.

In recent years a great deal of effort has been expended by vehicle makers to reduce the weight of vehicles to improve fuel efficiency, without unduly sacrificing structural strength. The bumper constitutes one component of the vehicle where potentially appreciable weight can be reduced. Conventially bumper faceplates have been made of low carbon steel, providing a relatively low cost, strong, high modulus structure which can be chromium plated to provide a bright, corrosion resistant appearance. Unfortunately, such a bumper is a relatively heavy structure, and due to its cantilevered location has a high multiplying effect on the weight of associated structural components in the vehicle. High strength low alloy (HSLA) steels offer opportunities for weight reduction, but not without significant reductions in formability, and problems with consistency of properties. Major emphasis has been given to reduction of weight through substitution of aluminum faceplates, with either anodized or chromium plated surfaces. The former has not found acceptance with many automotive manufacturers due to its poor level of specularity and brightness.

Both anodized and chromium plated aluminum have a major shortcoming in their susceptibility to damage from stone impingement. Due to the rather brittle nature of the surface layers and the low modulus of the substrate the initiation of cracks or stone damage points can be a fairly sever problem. If the damage penetrates the coatings to the substrate, corrosion of the exposed aluminum can be rapid. This is particularly true with chromium plating, where an extremely unfavorable galvanic couple results from the ratio of the large area of the more noble chromium surface compared to the minute area of the exposed aluminum at a damage point.

While an unfavorable corrosion reaction can also result from damage to chromium plating on a carbon steel substrate, the susceptibility to this type of damage is much less than with a substrate of aluminum, primarily due to the high modulus of the steel.

An object of the invention is the provision of a corrosion resistant bumper having a bright, durable surface on a substrate strong enough to meet governmental motor vehicle safety and damage standards at the lowest possible weight while still being cost effective.

Other objectives, advantages, and details of the composite material and bumper as provided by this invention appear in the following detailed description of preferred embodiments of the invention as well as the drawings.

Briefly, in accordance with the invention a vehicular bumper is composed of composite material having a first outer layer of stainless steel with desired surface characteristics, such as brightness, corrosion-resistance and strength, a second outer or base layer of heat treatable aluminum which contributes strength at a minimum of weight and third intermediate layer of essentially commercially pure aluminum metallurgically bonded between the first and second layers, the third layer of pure aluminum providing a transition stage to permit bonding of the first stainless steel layer to the second or base alloyed aluminum layer. The stainless steel is preferably an AISI (American Iron and Steel Institute) Type 301 which offers the best combination of desirable characteristics of currently available stainless steels, in a thickness ranging from approximately 0.010 to 0.020 inch; the heat treatable aluminum is preferably chosen from one of several in the AA (Aluminum Association) 7000 series which have the necessary technical and economic requirements including AA 7021, 7121, 7029, 7129, 7046, 7146, in a thickness ranging from approximately 0.050 to 0.150 inch, and the transition layer is a commercially pure aluminum such as AA 1145 or other high purity aluminum in a thickness ranging from approximately 0.010 to 0.020 inch. An additional layer of high purity aluminum approximately 0.010 to 0.020 inch thick may be provided on the reverse or external face of the heat treatable aluminum layer, in order to enhance the corrosion resistance of the heat treatable aluminum. The composite material, after being bonded and subsequently processed in strip form is heat treated in the process of fabricating the bumper shape in order to strengthen the composite to desired levels.

Turning now to the drawings.

Figure 1:
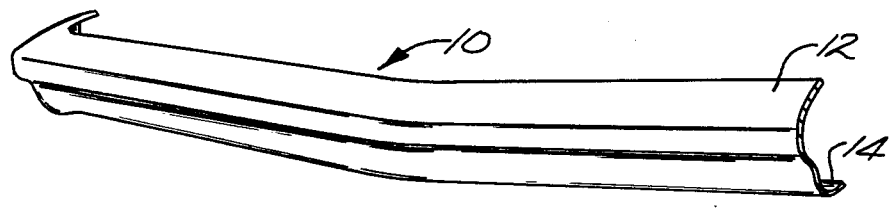
FIG. 1 is perspective view of a cut-off portion of a vehicular bumper formed of composite material made in accordance with the invention.
Figure 2:
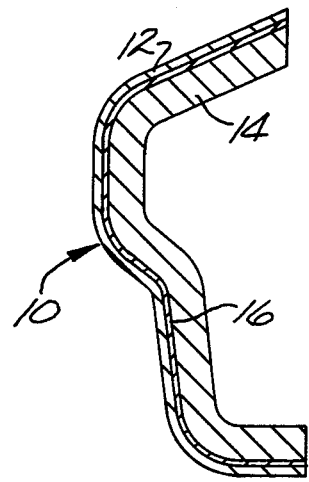
FIG. 2 is and end view of the FIG. 1 bumper looking at the cut off end.

In accordance with a first embodiment of the invention a bumper faceplate 10 comprises an outer layer 12 of material having certain selected characteristics including excellent corrosion resistance, high strength and brightness, a second outer or base layer 14 of a heat treatable aluminum which contributes strength at a minimum of weight and a third intermediate layer 16 of essentially commercially pure aluminum sandwiched between layers 12 and 14 and metallurgically bonded thereto preferably by solid state bonding techniques as explained below.

AISI Type 301 stainless steel is preferred for layer 12 since it provides the most desirable characteristics for the outer surface of a vehicular bumper of currently available materials. Although other stainless steels could be used as mentioned above, they are, in general, less desirable because they are either more expensive, less formable, or lower in strength. Layer 12 can be as thin as 0.010 inch and still provide the desired surface and strength characteristics required and can be at thick as 0.020 inch and still permit substantial weight reduction at acceptable cost for the composite bumper. One of the considerations in the selection of thickness is the particular configuration of the bumper, that is for a bumper which has small radii bends a slightly thicker layer may be selected as opposed to a bumper that has only large radii bends.

Layer 14 is selected from an aluminum alloy which can be heat treated to provide, in conjunction with layer 12, the necessary strength called for in a bumper. Suitable alloys include AA 7021, 7029, 7129, 7046, and 7146. These aluminum alloys have compositions, by weight, as set forth on Table I. Layer 14 is provided in a thickness from approximately 0.050 and 0.150 inch depending upon the selected thickness of the bumper as well as the thickness of layers 12 and 16.

TABLE I

| AA Number | Aluminum Alloy Compositions - % by Weight | | | | | | | | | | | | |
|---|---|---|---|---|---|---|---|---|---|---|---|---|---|
| | Si | Fe | Cu | Mn | Mg | Cr | Zn | Ga | V | Zr | Ti | Others | al |
| 7021 | 0.25 | 0.40 | 0.25 | 0.10 | 1.2–1.8 | 0.05 | 5.0–6.0 | — | — | 0.08–0.18 | 0.10 | 0.15 | Remainder |
| 7029 | 0.10 | 0.12 | 0.50–0.9 | 0.03 | 1.3–2.0 | — | 4.2–5.2 | — | 0.05 | — | 0.03 | 0.10 | Remainder |
| 7129 | 0.15 | 0.30 | 0.50–0.9 | 0.10 | 1.3–2.0 | 0.10 | 4.2–5.2 | 0.03 | 0.05 | — | 0.05 | 0.15 | Remainder |
| 7046 | 0.20 | 0.40 | 0.25 | 0.30 | 1.0–1.6 | 0.20 | 6.6–7.6 | — | — | 0.10–0.18 | 0.06 | 0.15 | Remainder |
| 7146 | 0.20 | 0.40 | — | — | 1.0–1.6 | — | 6.6–7.6 | — | — | 0.10–0.18 | 0.06 | 0.15 | Remainder |

*Compositions shown in percent maximum unless shown as a range.

As mentioned previously, layer 16 functions as a transition stage to isolate from the stainless steel to aluminum interface those alloying elements in the heat treated aluminum layer which would act to degrade the strength of the interfacial bond. A commercially pure aluminum such as AA 1145 has been found to be suitable and may range in thickness from approximately 0.010 inch to 0.020 inch. The particular thickness chosen is again largely based on the type of forming operation to which the bumper material is to be subjected. That is, more extreme forming operations require thicker layers than less extreme forming operations, to insure that there is an adequate thickness to the transition layer coextensive with the stainless steel and aluminum base layers 12 and 14 after all forming operations are completed.

Bumper material of this invention is preferably made by taking strips of stainless steel, commercially pure aluminum and heat treatable aluminum, cleaning the materials to be bonded by removing bond deterrents from the material surfaces, squeezing the strips between pressure bonding rolls to form a bond between adjacent strips and then thermally sintering the material to enhance the strength of the bond. In bonding the several strips it is desirable that most of the material reduction occur in the aluminum so that cold working of the stainless steel is limited in order to retain ductility of the stainless steel for forming the material into a bumper configuration. Reference may be had to U.S. Pat. No. 3,740,828, assigned to the assignee of the instant invention, which discloses a suitable method for bonding stainless steel and aluminum so that the majority of material reduction in strip thickness occurs in the aluminum.

In accordance with a preferred embodiment of the inventions strips from a reel of AISI Type 301 stainless steel having a thickness of 0.015 inch, a reel of AA 1145 commercially pure aluminum having a thickness of 0.030 inch, and a reel of AA 7021 aluminum alloy having a thickness of 0.140 inch are subjected to appropriate conventional cleaning steps for removing dirt, oils, grease, bond deterring oxide films and the like from material surfaces as described in the aforementioned U.S. Pat. No. 3,740,828. For example, the stainless steel material may be subjected to a conventional bright annealing step wherein the material is heated to a temperature on the order of 1900°–2000° F. to anneal the metal and simultaneously to remove gross contaminants and bond deterrents from the material surface. The aluminum starting materials are subjected to scrubbing for removing gross contaminants from the aluminum surfaces and are also subjected to appropriate treatment for substantially completely removing bond-deterrent oxide films from the materials. The clean strips, 12, 14, and 16 then are advanced simultaneously from pay-off reels or the like, between suitable pressure bonding rolls by driving rotation of at least one of the rolls, the squeezing and advancing of the strip materials being regulated for reducing the thickness of at least the aluminum materials to an extent sufficient to form at least an incipient metallurgical bond among the strips while avoiding such reductions of the stainless steel material as would cause significant work hardening. As noted in the previously cited U.S. Pat. No. 3,740,828 the squeezing and advancing of the strip materials which will occur between the bonding rolls will be influenced by the peripheral speed of the bonding rolls, by the pressure under which the rolls are forced toward each other, by the drag or back tension exerted on the strip materials as they are advanced to the rolls, by the front tension applied to the bonded materials leaving the rolls, by the relative hardness of the strip materials, by the nature of the surface finishes on the bonding rolls and the lubricants, if any, used between the rolls and strip materials, and, where one or more of the rolls is not positively driven, by the weight of the rolls themselves. These variables are selected to obtain the desired degree of thickness reduction in the several strips of material to effect bonding. In the instant case after bonding strips 12, 14, 16 had an after bonded thickness of 0.015, 0.015, and 0.070 inch respectively.

Following the bonding process the resulting incipiently-bonded composite material is then sintered in the solid phase at a temperature in the range from 550° F. to 900° F. for a sufficient period of time to strengthen the metallurgical bond between the three component layers, and to anneal the aluminum components of the bonded composite materials, the latter in order to provide maximum formability in the aluminum layers.

In accordance with the invention, the bonded composite strip material is subsequently heat treated in the course of fabricating a bumper shape to develop the desired yield strength in the composite in excess of 50,000 psi.

When AA 7021 is used for the heat treatable layer the formed composite bumper is solution heat treated at approximately 750°–825° F. and fan quenched through the temperature range of 725°–400° F. at 6° F. per second or greater. The composite is incubated a minimum of eight hours at room temperature after quenching, and then aged in a two step process consisting of two hours at approximately 240°–260° F. and four hours at approximately 305°–325° F. with a maximum heating rate for aging of 100° F. per hour.

In order to satisfy certain aesthetic requirements it may be desirable to provide a conventional chromium flash on the stainless steel surface since AISI type 301 stainless steel has a slightly yellow reflective appearance as contrasted to the blue-black reflective appearance of a chromium plated surface.

Figure 3:
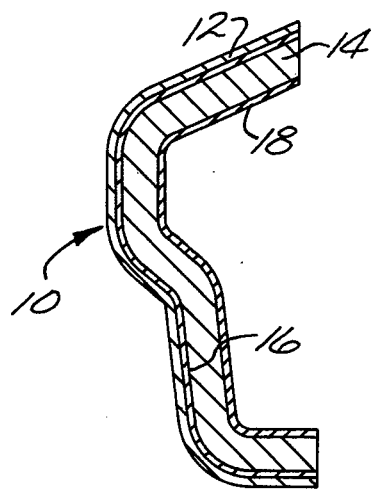
FIG. 3 is a view similar to FIG. 2 of a second embodiment of the invention.

As seen in FIG. 3 a layer 18 which may be of the same material as layer 16, can be metallurgically bonded to the reverse face of layer 14 opposite to layers 12 and 16 and is bonded to the composite in the same manner as the other layers. Layer 18, of essentially commercially pure aluminum is provided in instances where extra corrosion resistance is desired to inhibit corrosion of the heat treatable layer 14 on its exposed reverse face.

Bumpers made in accordance with the invention offer many advantages. Not only are such bumpers light in weight relative to conventional chromium plated carbon steel bumpers, they can be fabricated using equipment generally compatible with processing equipment used for existing steel systems, with the addition of the heat treating step for the aluminum. That is, use of the bumpers made in accordance with the invention would not require major capital investment for automotive manufacturers who already produce steel bumper systems.

The presence of the thin stainless steel layer on the outer surface provides sufficient contribution to overall strength that for equivalent performance in barrier and impact testing the stainless aluminum steel bumper is as light as a chrome-plated aluminum bumper which has been suggested as a weight reducing bumper system. That is, the high yield strength of the stainless steel layer permits lower composite thicknesses to be used for equivalent performance compared to chrome plated aluminum. The stainless steel provides high strength, excellent durability and corrosion resistance, as well as good formability.

Although particular embodiments of the composite materials and bumpers of this invention have been described by way of illustration, it should be understood that this invention includes all modifications and equivalents thereof which fall within the scope of the appended claims.

We claim:

1. A method for making strong, light weight composite material having improved formability characteristics comprising the steps of taking a relatively thin layer of commercially pure aluminum; a relatively thick layer of heat treatable aluminum and a relatively thin layer of stainless steel, annealing the stainless steel layer, advancing the layers into interfacial contact with one another with the heat treatable aluminum layer and the stainless steel layer sandwiching the commerically pure aluminum layer, squeezing the layers sufficiently to reduce their total thickness and form a composite having a metallurgical bond between contiguous layers, regulating the squeezing and advancing so that reduction in thickness of the layers occurs primarily in the heat treatable aluminum layer and the commercially pure aluminum to minimize work hardening of the stainless steel layer, sintering the composite to strengthen the metallurgical bond, annealing the commercially pure aluminum layer and the heat treatable aluminum layer to provide maximum formability of the composite, and forming the composite into a selected configuration thereby work hardening the stainless steel layer and thereafter heat treating the composite to develop the strength of the aluminum and maximize the yield strength of the composite.

2. A method according to claim 1 in which the heat treatable aluminum layer has a thickness prior to being squeezed between approximately 0.050 inch and 0.150 inch, and the stainless steel layer and the commercially pure aluminum layer each has a thickness prior to being squeezed between approximately 0.010 inch and 0.020 inch.

3. A method according to claim 1 in which the heat treatable aluminum is a 7000 series aluminum alloy.

4. A method according to claim 1 in which the stainless steel is an AISI type 301.

* * * * *